US012018647B2

(12) United States Patent
Hørdum

(10) Patent No.: US 12,018,647 B2
(45) Date of Patent: Jun. 25, 2024

(54) HANDLING OF A WIND TURBINE BLADE

(71) Applicant: LM WIND POWER INTERNATIONAL TECHNOLOGY II APS, Kolding (DK)

(72) Inventor: Tomas Kiré Hørdum, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 900 days.

(21) Appl. No.: 16/981,035

(22) PCT Filed: Mar. 18, 2019

(86) PCT No.: PCT/EP2019/056671
§ 371 (c)(1),
(2) Date: Sep. 15, 2020

(87) PCT Pub. No.: WO2019/179922
PCT Pub. Date: Sep. 26, 2019

(65) Prior Publication Data
US 2021/0108616 A1    Apr. 15, 2021

(30) Foreign Application Priority Data

Mar. 19, 2018   (EP) .................................... 18162629

(51) Int. Cl.
*F03D 13/40*    (2016.01)
*B23Q 3/00*    (2006.01)
(Continued)

(52) U.S. Cl.
CPC ............... *F03D 13/40* (2016.05); *B23Q 3/00* (2013.01); *B23Q 3/063* (2013.01); *F03D 1/0675* (2013.01);
(Continued)

(58) Field of Classification Search
CPC . Y02E 10/72; F03D 13/40; B60P 3/40; F05B 2260/02
See application file for complete search history.

(56) References Cited

U.S. PATENT DOCUMENTS 3,497,082 A * 2/1970 Flitter .................... B65H 15/02
414/766
3,561,320 A * 2/1971 Nelson ..................... F16L 1/10
29/559
(Continued)

FOREIGN PATENT DOCUMENTS

CN   102705177 A   10/2012
DE   102010042783 A1 * 4/2012
(Continued)

OTHER PUBLICATIONS

World's first wind turbine blade beyond 100 meters, built by LM Wind Power found at: https://www.youtube.com/watch?v=ZiH823CVYCU (Year: 2019).*
(Continued)

*Primary Examiner* — Mahdi H Nejad
(74) *Attorney, Agent, or Firm* — Nath, Goldberg & Meyer; Jerald L. Meyer; Tanya E. Harkins

(57) ABSTRACT

Disclosed is a root end element for attachment to a root end of a wind turbine blade, a root end manipulator configured to manipulate a wind turbine blade, and a blade manipulation system comprising the root end element and the root end manipulator. The root end element being configured to support the root end of the wind turbine blade.

16 Claims, 12 Drawing Sheets

(51) Int. Cl.
  *B23Q 3/06* (2006.01)
  *F03D 1/06* (2006.01)
  *F03D 80/00* (2016.01)
  *B23Q 3/02* (2006.01)
  *B23Q 3/10* (2006.01)
  *B60P 3/40* (2006.01)

(52) U.S. Cl.
  CPC ............... *F03D 80/00* (2016.05); *B23Q 3/02* (2013.01); *B23Q 3/064* (2013.01); *B23Q 3/105* (2013.01); *B60P 3/40* (2013.01); *F05B 2240/30* (2013.01); *F05B 2260/02* (2013.01)

(56) References Cited

U.S. PATENT DOCUMENTS

| | | | | |
|---|---|---|---|---|
| 5,466,114 | A | * 11/1995 | Swain | B23B 31/4046 269/48.1 |
| 2005/0031431 | A1 | 2/2005 | Wobben | |
| 2007/0231137 | A1 | 10/2007 | Nitzpon | |
| 2013/0119002 | A1 | * 5/2013 | Frederiksen | B65D 85/68 211/60.1 |
| 2015/0369209 | A1 | * 12/2015 | Datta | B60P 7/12 211/85.8 |

FOREIGN PATENT DOCUMENTS

| | | | |
|---|---|---|---|
| DE | 102012020233 | A1 * | 10/2012 |
| EP | 2666669 | A1 | 11/2013 |
| EP | 2698530 | A2 | 2/2014 |
| EP | 2555947 | B1 | 4/2014 |
| EP | 2666669 | B1 | 6/2016 |

OTHER PUBLICATIONS

How to build a wind turbine blade found at: https://www.youtube.com/watch?v=WxlhGxET7N8 (Year: 2022).*
Building record-breaking blades to change the world through the power of wind found at: https://www.youtube.com/watch?v=smLk7Z4Xxyl (Year: 2021).*
DE102012020233A1 (TD1) (Year: 2014).*
DE 102010042783 A1 (TD) (Year: 2012).*

* cited by examiner

HANDLING OF A WIND TURBINE BLADE

This is a National Phase Application filed under 35 U.S.C. 371 as a national stage of PCT/EP2019/056671, filed Mar. 18, 2019, an application claiming the benefit of European Application No. 18162629.2, filed Mar. 19, 2018, the content of each of which is hereby incorporated by reference in its entirety.

FIELD OF THE INVENTION

The present disclosure relates to handling, such as transporting and/or arranging of a wind turbine blade, in particular handling of a wind turbine blade in a post moulding process of manufacture.

BACKGROUND

A wind turbine blade is typically handled, such as transported and/or arranged between post moulding processes and/or afterwards.

In known blade handling systems, the root of the wind turbine blade is positioned on a number of rollers on a root end carrier, and the tip is secured by a tip clamp of a tip end carrier positioned approximately ⅓ of the length of the blade from the tip end.

However, as the blades get bigger, e.g. lengths may exceed 70 meters and weights may exceed 30 tonnes, inconveniences may occur in using known blade handling systems.

Furthermore, as technology advance and new post moulding processes turn up, new possibilities in post mould handling is necessitated.

SUMMARY

It is an object of the present disclosure to provide methods and elements for enhancing handling of wind turbine blades, in particular during post mould handling.

It is a further object of the present disclosure to provide methods and elements for handling of wind turbine blades, which facilitates reduced costs, increased flexibility, decreased risk of failures, increased manufacturing safety, and/or increased quality of the produced wind turbine blades.

Thus, the present disclosure relates to a root end element for attachment to a root end of a wind turbine blade, a root end manipulator configured to manipulate a wind turbine blade, and a system comprising a root end element, a root end manipulator, and optionally a tip end structure configured to support the airfoil region of the wind turbine blade.

Accordingly, a root end element for attachment to a root end of a wind turbine blade is disclosed. The wind turbine blade having a longitudinal axis and comprising the root end, a root region, an airfoil region with a tip, a pressure side, a suction side and a chord line extending between a leading edge and a trailing edge. The root end having a root end surface an inner root surface, and an outer root surface. The root end surface being ring formed in a root end plane substantially perpendicular to the longitudinal axis. The root end surface may have an inner root diameter and an outer root diameter. The inner root diameter may be smaller than the outer root diameter.

The root end element comprises a plurality of attachment points for attachment to the root end, such as to the root end surface of the root end. The attachment points are positioned along an attachment point circle in a root end element plane. The attachment point circle may have an attachment point centre.

The root end element plane may be substantially perpendicular to the longitudinal axis of the wind turbine blade, e.g. when the root end element is attached to the root end of the wind turbine blade. The root end element plane may be substantially parallel to the root end plane, e.g. when the root end element is attached to the root end of the wind turbine blade. The root end element may be substantially circular in the root end element plane.

The root end element may be configured to support the root end of the wind turbine blade. For example, the root end element may be configured to support the root end of the wind turbine blade during manipulation, such as lifting rotation and/or movement, of the wind turbine blade. Alternatively or additionally, the root end element may be configured to support the root end of the wind turbine blade, such as to stabilize the wind turbine blade, such as to prevent rotation of the wind turbine blade.

Also disclosed is a root end manipulator configured to manipulate, such as rotate and/or elevate, a wind turbine blade. The wind turbine blade having a longitudinal axis and comprising a root end, a root region, an airfoil region with a tip, a pressure side, a suction side and a chord line extending between a leading edge and a trailing edge. The root end having a root end surface an inner root surface, and an outer root surface. The root end surface being ring formed in a root end plane substantially perpendicular to the longitudinal axis. The root end surface may have an inner root diameter and an outer root diameter. The inner root diameter may be smaller than the outer root diameter.

The root end manipulator comprises a base structure configured to contact the ground and a root end interface connected to the base structure, such as rotationally connected or fixedly connected.

The root end interface may be configured to attach to the root end, such as to the root end surface of the root end. For example, via a root end element, such as the disclosed root end element. The root end interface may comprise a root end element, such as the disclosed root end element, e.g. a root end element comprising a plurality of attachment points for attachment to the root end, such as to the root end surface of the root end.

The root end interface may be configured for cooperation with a root end element, such as the disclosed root end element, attached to the root end of the wind turbine blade.

Also disclosed is a blade manipulation system. The blade manipulation system comprises a root end element and a root end manipulator, such as the disclosed root end element and disclosed root end manipulator. Additionally, the blade manipulation system may comprise a tip end structure configured to support the airfoil region of the wind turbine blade.

The root end element may comprise one or more manipulator attachment points, such as a first manipulator attachment point, a second manipulator attachment point, a third manipulator attachment point and/or a fourth manipulator attachment point. The root end element may comprise a plurality of manipulator attachment points. The plurality of manipulator attachment points may include the first manipulator attachment point, the second manipulator attachment point, the third manipulator attachment point and/or the fourth manipulator attachment point. The plurality of manipulator attachment points, such as the first manipulator attachment point, the second manipulator attachment point, the third manipulator attachment point and/or the fourth manipulator attachment point may be configured for cooperation with a root end interface of a root end manipulator, such as the root end interface of the disclosed root end manipulator.

The plurality of manipulator attachment points, such as the first manipulator attachment point, the second manipulator attachment point, the third manipulator attachment point and/or the fourth manipulator attachment point, may be positioned along a manipulator attachment point circle in the root end element plane. The manipulator attachment point circle may be smaller than the attachment point circle.

The manipulator attachment points may be positioned such that the manipulator attachment point circle is substantially the same for different root end elements, e.g. root end elements adapted for different sized wind turbine blade. For example, an assembly of root end elements may comprise a first root end element and a second root end element, wherein the first root end element comprises an attachment point circle being larger than an attachment point circle of the second root end element, and wherein the first root end element comprises a manipulator attachment point circle being substantially the same size as a manipulator attachment point circle of the second root end element.

The root end element may comprise an inner rim. The inner rim may form an inner rim circle in the root end element plane. The inner rim circle may have an inner rim centre. The inner rim may be configured to interface with one or more interface elements, e.g. of the root end manipulator. The inner rim may form manipulator attachment points, such as the plurality of manipulator attachment points, and/or such as the first manipulator attachment point, the second manipulator attachment point and/or the third manipulator attachment point. The inner rim may form continuous manipulator attachment points, e.g. comprising the plurality of manipulator attachment points.

The inner rim may comprise an inner rim surface. The inner rim surface may be facing the inner rim centre. The inner rim surface may have an inner rim surface normal in the root end element plane. The inner rim surface may have a width perpendicular to the root end element plane. The inner rim surface may be provided for receiving a force in the root end element plane, e.g. substantially perpendicular to the longitudinal axis of the wind turbine blade. The inner rim surface may be provided to move, e.g. elevate the root end. Furthermore, the inner rim surface may be provided for turning the wind turbine blade about the longitudinal axis.

The inner rim may comprise a first inner rim surface. The first inner rim surface may have a first inner rim surface normal. The first inner rim surface normal may span a first angle with the root end element plane. The inner rim may comprise a second inner rim surface. The second inner rim surface may have a second inner rim surface normal. The second inner rim surface normal may span a second angle with the root end element plane. The first inner rim surface and/or the second inner rim surface may be provided for receiving a force perpendicular to the root end element plane, e.g. substantially parallel to the longitudinal axis of the wind turbine blade. The first inner rim surface and/or the second inner rim surface may be provided to move, e.g. to push or pull the root end substantially along the longitudinal axis.

A third angle may extend between the first inner rim surface normal and the second inner rim surface normal. The third angle may be between 90 and 180 degrees, such as between 135 and 170 degrees, such as 160 degrees.

The first inner rim surface normal and/or the second inner rim surface normal may be substantially parallel to the longitudinal axis. The first inner rim surface normal may be substantially opposite the second inner rim surface normal. The first angle may be between 45 and 90 degrees, such as 75 degrees. The second angle may be between −45 and −90 degrees, such as −75 degrees. For example, the first inner rim surface and/or the second inner rim surface may be perpendicular to the inner rim surface and/or within 45 degrees of perpendicular. The first inner rim surface and the inner rim surface may form an obtuse angle. The second inner rim surface and the inner rim surface may form an obtuse angle.

Providing the first inner rim surface and/or the second inner rim surface with an obtuse angle to the inner rim surface may be advantageous to facilitate easy engagement with an interface element.

The plurality of attachment points for attachment of the root end element to the root end may comprise 5-20 attachment points, such as 10-15 attachment points. The attachment points may be configured for attachment to bolts of the root end, such as a portion of the bolts of the root end. The root end may comprise 50-250 bolts, such as 100-200 bolts.

The plurality of attachment points may comprise a first attachment point, a second attachment point and/or a third attachment point. The plurality of attachment points may comprise a fourth attachment point and/or a fifth attachment point. The attachment points may be distributed evenly along the attachment point circle.

An angular distance between the first attachment point and the second attachment point in the attachment point circle and an angular distance between the second attachment point and the third attachment point in the attachment point circle may be substantially the same as an angular distance between the third attachment point and the first attachment point in the attachment point circle.

The angular distance between the first attachment point and the second attachment point in the attachment point circle may be the same as the angular distance between the second attachment point and the third attachment point in the attachment point circle. The angular distance between the first attachment point and the second attachment point in the attachment point circle may be the same as the angular distance between the third attachment point and the first attachment point in the attachment point circle.

The angular distance between the first attachment point and the second attachment point in the attachment point circle may be less than 125 degrees, such as 120 degrees. The angular distance between the second attachment point and the third attachment point in the attachment point circle may be less than 125 degrees, such as 120 degrees. The angular distance between the third attachment point and the first attachment point in the attachment point circle may be less than 125 degrees, such as 120 degrees.

The angular distance between the first attachment point and the second attachment point in the attachment point circle may be less than 95 degrees, such as 90 degrees. The angular distance between the second attachment point and the third attachment point in the attachment point circle may be less than 95 degrees, such as 90 degrees. The angular distance between the third attachment point and the fourth attachment point in the attachment point circle may be less than 95 degrees, such as 90 degrees. The angular distance between the fourth attachment point and the first attachment point in the attachment point circle may be less than 95 degrees, such as 90 degrees.

The root end element may comprise one or more supports, such as a first support and/or a second support. The supports, such as the first support and/or the second support, may be configured to contact the ground. The support(s), such as the first support and/or the second support, may be configured to prevent a lowest point of the root end from contacting the ground. The support(s), such as the first support and/or the second support, may be configured to prevent a lowest point of the wind turbine blade from contacting the ground.

The support(s), such as the first support and/or the second support, may be integrally formed with the root end element and/or may be fixed, such as welded, to the root end element. Alternatively or additionally, the root end element may comprise one or more, such as a plurality of, support attachment elements. The plurality of support attachment elements may be configured for connection with the first support and/or the second support, e.g. such that the first support and/or the second support are configured to contact the ground and prevent a lowest point of the root end and/or the wind turbine blade from contacting the ground. The plurality of support attachment elements may comprise more than three, such as four or five or six or seven or eight, support attachment elements.

The plurality of support attachment elements may be spaced along an outer perimeter of the root end element. For example, the plurality of support attachment elements may be equidistantly spaced along an outer perimeter of the root end element. The plurality of support attachment elements may be spaced by an attachment spacing angle. The attachment spacing angle may be between 60-120, such as 80-100 degrees, such as 90 degrees.

The plurality of support attachment elements, such as each of the plurality of support attachment elements, may comprise a plurality of support attachment configurations, e.g. including a first support attachment configuration and/or a second support attachment configuration. The first support attachment configuration may be configured to connect the first support and/or the second support in a first direction. The second support attachment configuration may be configured to connect the first support and/or the second support in a second direction. Thus, the same support attachment element may provide for different positions and/or directions of attachment of supports, and thereby, the same support attachment element may provide for support of the wind turbine blade being positioned in different orientations. For example, the second direction may be separated by 90 degrees with respect to the first direction. The first direction and the second direction may be separated by the attachment spacing angle. The attachment spacing angle is indicative of the necessary rotation of the wind turbine blade between positioned where the wind turbine blade may be positioned and supported. Providing that the support may be rotated the same angular distance provides that the same support attachment element may be used in for the support in two following positions.

The root end element may comprise a lifting ring configured for connection to a lifting arrangement, such as a crane. The root end element may comprise a plurality of lifting rings. The lifting ring(s) may provide that the root end element may be used in the repositioning of the wind turbine blade. The lifting ring may be provided at a position substantially in line with the centre of mass of the wind turbine blade.

The root end element may be attached to the wind turbine blade while the wind turbine blade is still positioned in a mould or half-mould, such as the mould or half-mould used to form the wind turbine blade.

The root end manipulator comprises a root end interface, e.g. being configured for cooperation with the root end element.

The root end interface may comprise one or more interface elements, such as a first interface element. The root end interface may comprise a plurality of interface element, e.g. including the first interface element, a second interface element, a third interface element and/or a fourth interface element. The plurality of interface elements may comprise similar features.

One or more interface elements, such as the first interface element, the second interface element, the third interface element and/or the fourth interface element may be configured to cooperate with the root end element attached to the root end, such as the manipulator attachment points of the root end element and/or the inner rim of the root end element. For example, the first interface element may be configured to be fastened to a first manipulator attachment point, the second interface element may be configured to be fastened to a second manipulator attachment point, the third interface element may be configured to be fastened to a third manipulator attachment point, and/or the fourth interface element may be configured to be fastened to a fourth manipulator attachment point.

One or more interface elements, such as the first interface element, the second interface element, the third interface element and/or the fourth interface element may comprise a primary end. For example, the first interface element may comprise a first primary end, the second interface element may comprise a second primary end, the third interface element may comprise a third primary end and/or the fourth interface element may comprise a fourth primary end. The primary ends, such as first primary end, the second primary end, the third primary end and/or the fourth primary end, may be configured for cooperation with the root end element, such as the root end element attached to the root end.

One or more interface elements, such as the first interface element, the second interface element, the third interface element and/or the fourth interface element may be adjustable between a retracted configuration and an extended configuration. The length of an interface element, such as the first interface element, the second interface element, the third interface element and/or the fourth interface element in the extended configuration may be longer than the length of the interface element in the retracted configuration. The interface elements may be hydraulically adjusted. Alternatively, the interface elements may be manually adjusted, such as by substituting elements, e.g. shorter elements with longer elements.

One or more interface elements, such as the first interface element, the second interface element, the third interface element and/or the fourth interface element may comprise a fastening element, e.g. at the primary end. For example, the first interface element may comprise a fastening element at the first primary end, the second interface element may comprise a fastening element at the second primary end, the third interface element may comprise a fastening element at the third primary end, and/or the fourth interface element may comprise a fastening element at the fourth primary end. The fastening element(s) may be configured for fastening the interface element(s) to a manipulator attachment point of the root end element. The fastening element may be formed by a hole for receiving a pin to extend through a respective hole of the root end element, such as a respective hole of a manipulator attachment point of the root end element.

One or more interface elements, such as the first interface element, the second interface element, the third interface element and/or the fourth interface element may be configured to abut the root end element, such as the inner rim of the root end element, such as the inner rim surface. For example, the first interface element, the second interface element, the third interface element and/or the fourth interface element may be configured to be extended to abut the root end element, such as the inner rim of the root end element, such as the inner rim surface.

Alternatively or additionally, one or more interface elements, such as the first interface element, the second interface element, the third interface element and/or the fourth interface element may be configured to abut the inner root surface of the root end of the wind turbine blade. For example, the first interface element, the second interface element, the third interface and/or the fourth interface element may be configured to be extended to abut the inner root surface of the root end of the wind turbine blade.

The plurality of interface elements, such as the first interface element, the second interface element, the third interface element and/or the fourth interface element may be spaced, e.g. by interface element spacing angles. For example, the first interface element and the second interface element may be spaced by a first interface element spacing angle. The second interface element and the third interface element may be spaced by a second interface element. The third interface element and the fourth interface element or the first interface element may be spaced by a third interface element spacing angle. The fourth interface element and the first interface element may be spaced by a fourth interface element spacing angle. The first interface element spacing angle, the second interface element spacing angle and the third interface element spacing angle may be substantially the same, such as between 110-130 degrees, such as 120 degrees. The first interface element spacing angle, the second interface element spacing angle, the third interface element spacing angle and the fourth interface element spacing angle may be substantially the same, such as between 80-100 degrees, such as 90 degrees. The first interface element, the second interface element, the third interface element and/or the fourth interface element may be equidistantly spaced, e.g. by an interface element spacing angle, e.g. 90 degrees or 120 degrees.

Providing a plurality of interface elements, e.g. including the first interface element, the second interface element, the third interface element and/or the fourth interface element, may facilitate that a force provided by one interface element, such as the first interface element, in a first direction on the inner root surface or the root end element, may be counteracted by other interface elements, such as the second interface element and/or the third interface element, providing a force in a second direction on the inner root surface or the root end element. Thereby, friction between the primary ends of the interface elements and the inner root surface or the root end element may be increased and risk of unintentional slipping between the interface elements and the root end and/or root end element may be decreased. Thus, the position and orientation of the wind turbine blade may be more securely controlled. Alternatively or additionally, interface elements may be fastened, such as locked, to manipulator attachment points of the root end element to avoid unintentional slipping between the interface elements and the root end and/or root end element.

An interface element, such as the one or more interface elements, may comprise an interface wheel positioned at a primary end. For example, The first interface element may comprise a first interface wheel positioned at the first primary end. The second interface element may comprise a second interface wheel positioned at the second primary end. The third interface element may comprise a third interface wheel positioned at the third primary end. The fourth interface element may comprise a fourth interface wheel positioned at the fourth primary end. The inner rim may be configured to interface with one or more interface wheels. One or more interface wheels, such as the first interface wheel, the second interface wheel, the third interface wheel and/or the fourth interface wheel may be configured to cooperate with the inner rim of the root end element, such as the inner rim surface.

The first interface wheel may be a groove wheel, e.g. the first interface wheel may have a first interface groove. The second interface wheel may be a groove wheel, e.g. the second interface wheel may have a second interface groove. The third interface wheel may be a groove wheel, e.g. the third interface wheel may have a third interface groove. The fourth interface wheel may be a groove wheel, e.g. the fourth interface wheel may have a fourth interface groove. One or more interface grooves, such as the first interface groove, the second interface groove, the third interface groove and/or the fourth interface groove may be configured to cooperate with the inner rim of the root end element.

Providing an interface wheel with an interface groove may provide that the inner rim and thereby the root end element may be affected by forces in the longitudinal direction. Thus, the root end manipulator may manipulate, such as push and/or pull the wind turbine blade in the longitudinal direction of the wind turbine blade.

The root end interface may comprise an interface motor, such as a first interface motor, a second interface motor, a third interface motor and/or a fourth interface motor. The interface motor, such as the first interface motor, the second interface motor, the third interface motor and/or the fourth interface motor may be configured to rotate the first interface wheel, the second interface wheel and/or the third interface wheel. The interface motor, such as the first interface motor, the second interface motor, the third interface motor and/or the fourth interface motor may be a servo motor. A single interface motor may be configured to rotate more than one interface wheels, e.g. the first interface wheel, the second interface wheel, the third interface wheel and/or the fourth interface wheel. An interface motor may be designated to each interface wheel. The first interface motor may be configured to rotate the first interface wheel. The second interface motor may be configured to rotate the second interface wheel. The third interface motor may be configured to rotate the third interface wheel. The fourth interface motor may be configured to rotate the fourth interface wheel.

The root end interface may be rotatable relative to the base structure, e.g. about a rotation axis. The rotation axis may be configured to be substantially parallel to the longitudinal axis of the wind turbine blade, such that rotation of the root end interface about the rotation axis results in turning of the wind turbine blade about its longitudinal axis.

The rotation axis may be offset, e.g. by a first radial distance, from a centre of the root end interface, which may correspond to a centre of the root end surface of the wind turbine blade. For example, a first rotation distance from the rotation axis to the first primary end of the first interface element may be smaller than a second rotation distance from the rotation axis to a second primary end of the second interface element. By offsetting the rotation axis turning of the wind turbine blade may be made easier and range of motion during turning of the tip end of the wind turbine blade may be reduced. The rotation axis may be configured to be substantially coincident with the centre of mass of the wind turbine blade.

The root end manipulator may comprise a base motor. The base motor may be configured for rotating the root end interface relative to the base structure. The base motor may be provided to rotate the wind turbine blade. Alternatively or additionally, the base motor may be provided to position the root end interface. The base motor may be provided as an alternative or as an addition to the one or more interface motors.

The root end manipulator, such as the base structure of the root end manipulator, may comprise one or more vertically extending root elements. The root end elements may be adjustable between a low configuration and a high configuration, e.g. to alter the vertical position of the root end interface. The height of the one or more vertically extending root elements in the high configuration may be longer than the height of the one or more vertically extending root elements in the low configuration. Thus, the vertically extending root end element(s) may be provided to vertically position the root end of the wind turbine blade.

The root end element and/or the root end manipulator may be used in combination with a tip end structure configured to support the airfoil region of the wind turbine blade. For example, the blade manipulation system may comprise a tip end structure.

The tip end structure may comprise a tip end clamp part configured to be secured to the airfoil region. The tip end structure may comprise a tip end base structure configured to contact the ground.

The tip end clamp part may be pivotably connected to the tip end base structure, e.g. to allow rotation of the wind turbine blade about the longitudinal axis of the wind turbine blade.

The tip end base structure may comprise one or more vertically extending tip elements adjustable between a low configuration and a high configuration, such as to alter the vertical position of the tip end clamp part. For example, the height of the vertically extending tip elements in the high configuration may be longer than the height of the vertically extending tip elements in the low configuration.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
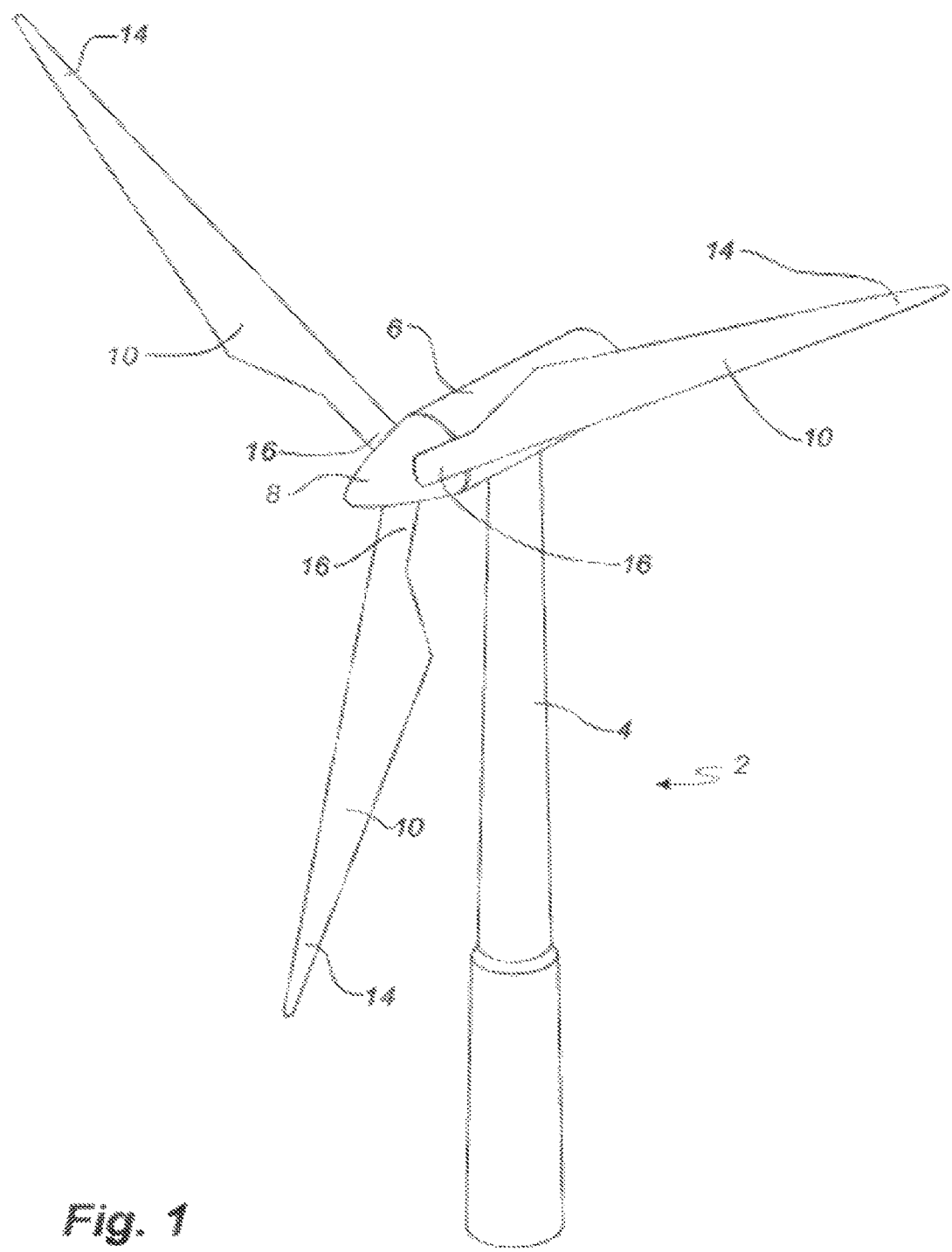
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
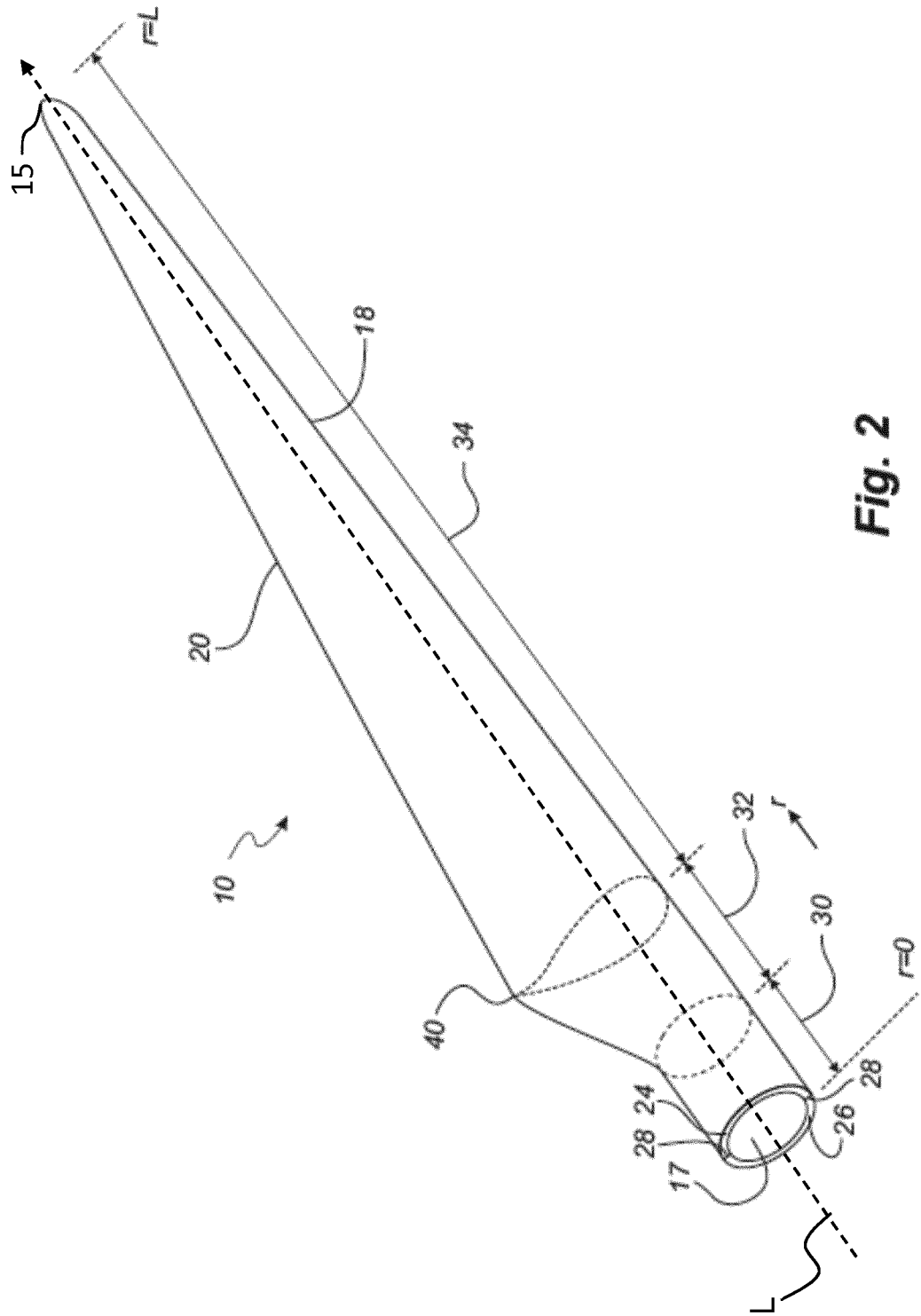
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L.

Figure 3:
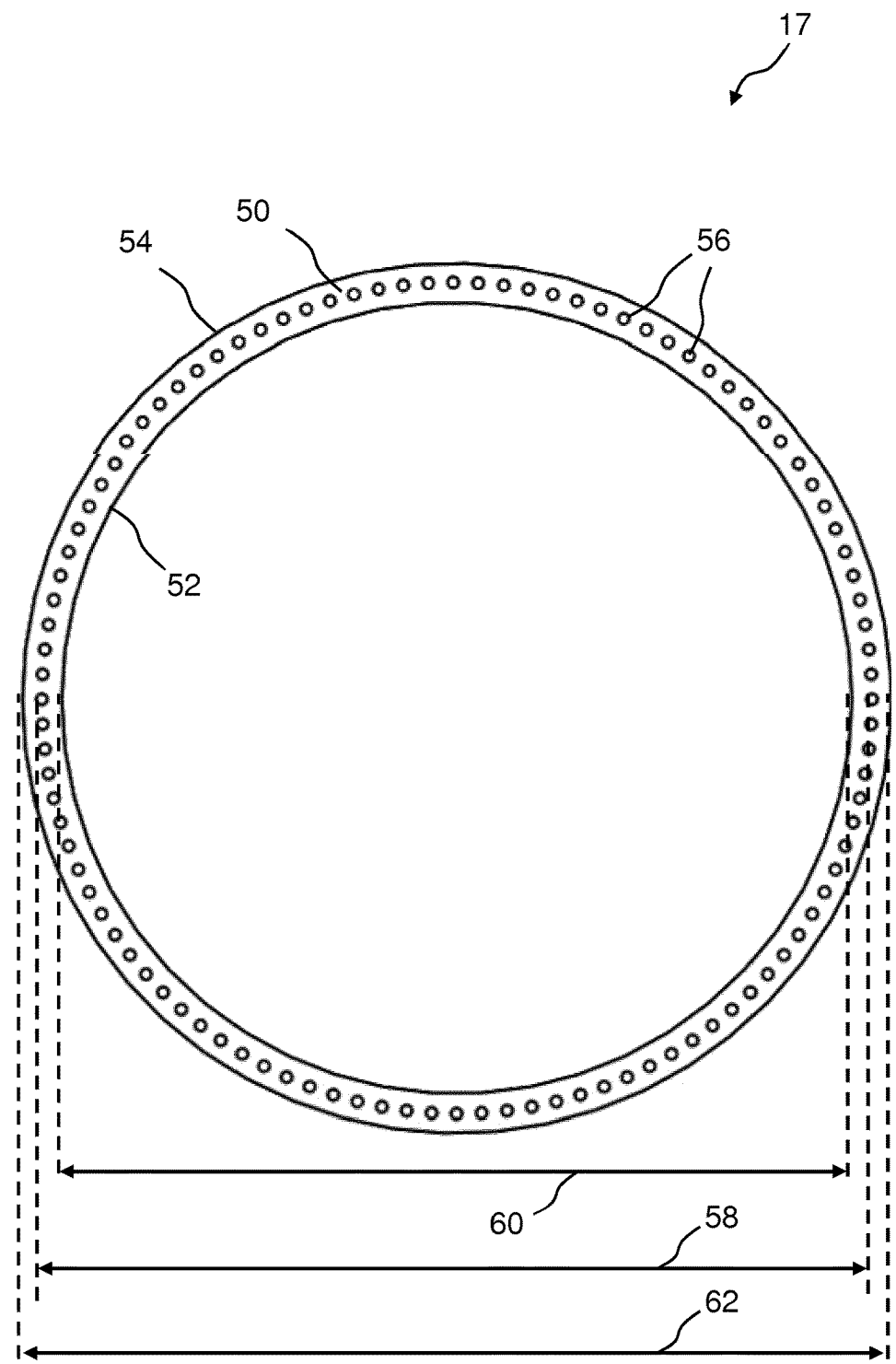
FIG. 3 schematically illustrates an exemplary root end of a wind turbine blade.

FIG. 3 schematically illustrates an exemplary root end 17 of a wind turbine blade, such as the wind turbine blade as illustrated in FIG. 2. FIG. 3 illustrates the root end 17 in the root end plane.

The root end 17 comprises a root end surface 50, an inner root surface 52, and an outer root surface 54. The root end surface 50 is substantially ring formed in the root end plane. For example, the root end surface 50 extends a circle in the root end plane, as shown.

The root end 17 has an inner root diameter 60 and an outer root diameter 62.

The root end 17 comprises a plurality of bolt attachments 56. The bolt attachments 56 is positioned on the root end surface 50 on a circle having a bolt circle diameter (BCD) 58.

Figure 4A:
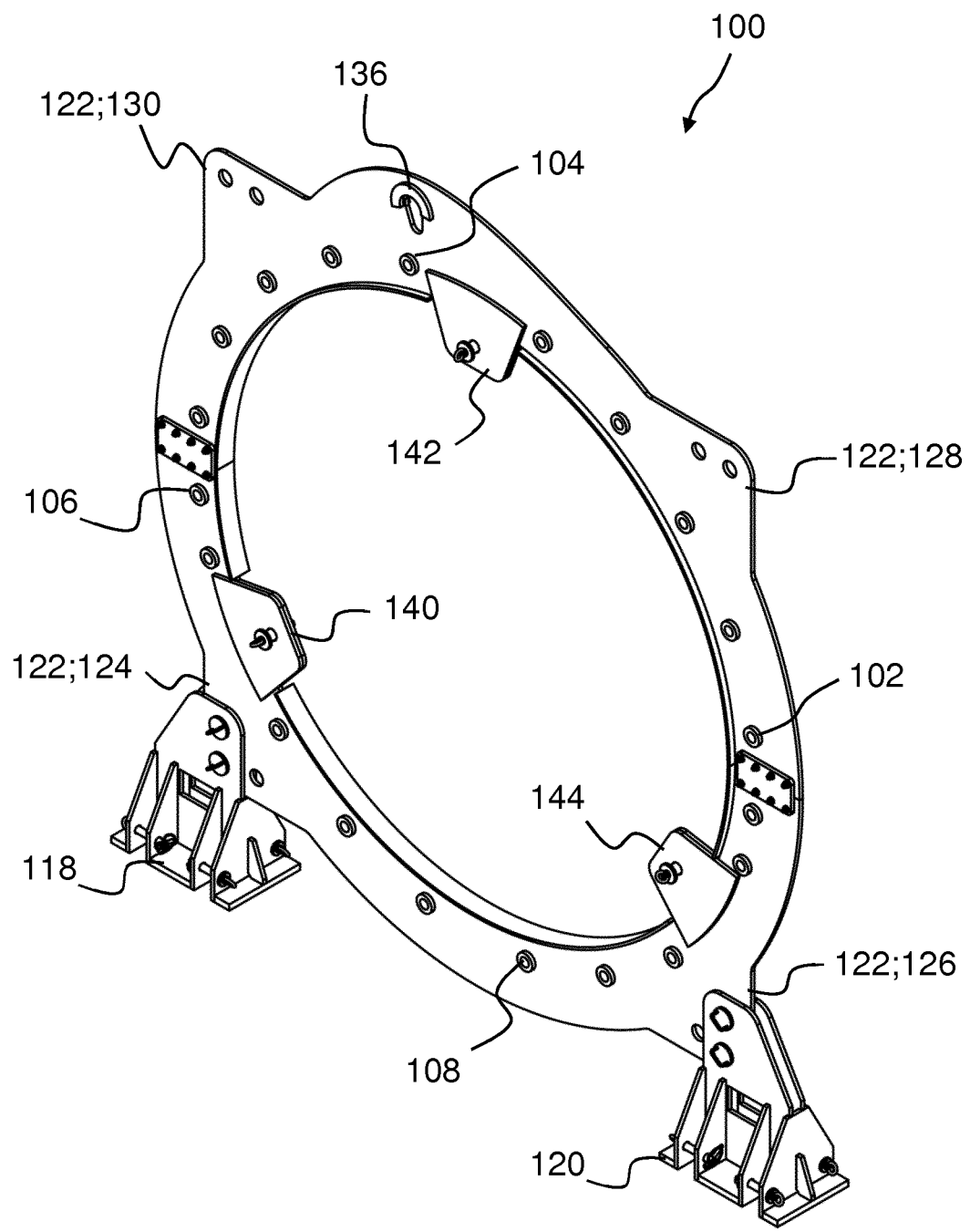
FIG. 4a schematically illustrates an exemplary root end element.

FIG. 4a schematically illustrates an exemplary root end element 100. The root end element 100 is configured for attachment to a root end of a wind turbine blade, such as the root end of FIG. 3. The root end element 100 extends in a root end element plane. The root end element 100 may be configured such that the root end element plane is parallel and/or coinciding with the root end plane of the root end, when the root end element 100 is attached to the root end.

The root end element 100 comprises a plurality of attachment points 102;104;106;108. The plurality of attachment points 102,104,106,108 is configured for attachment to the root end. For example, the plurality of attachment points 102,104,106,108 are configured for attachment to the bolt attachments 56 of the root end 17 (see FIG. 3). The plurality of attachment points 102,104,106,108 are positioned along an attachment point circle in the root end element plane. The attachment point circle may have a diameter equal to the bolt circle diameter (BCD) 58 of the root end 17 (see FIG. 3).

The plurality of attachment points 102,104,106,108 includes a first attachment point 102, a second attachment point 104, a third attachment point 106 and a fourth attachment point 108. The plurality of attachment points may include more attachment points, as shown.

The first attachment point 102, the second attachment point 104, the third attachment point 106 and the fourth attachment point 108 may be spaced equidistantly along the attachment point circle. For example, an angular distance between the first attachment point 102 and the second attachment point 104 may be 90 degrees, an angular distance between the second attachment point 104 and the third attachment point 106 may be less 90 degrees, an angular distance between the third attachment point 106 and the fourth attachment point 108 may be 90 degrees, and an angular distance between the fourth attachment point 108 and the first attachment point 102 may be 90 degrees.

The root end element 100 comprises supports 118,120 including a first support 118 and a second support 120. The first support 118 and the second support 120 are configured to contact the ground and prevent a lowest point of the root end of the wind turbine blade from contacting the ground.

The root end element 100 comprises a plurality of support attachment elements 122. The plurality of support attachment elements 122 is configured for connecting the first support 118 and the second support 120. The plurality of support attachment elements 122 includes a first support attachment element 124, a second support attachment element 126, a third support attachment element 128 and a fourth support attachment element 130.

Figure 5:
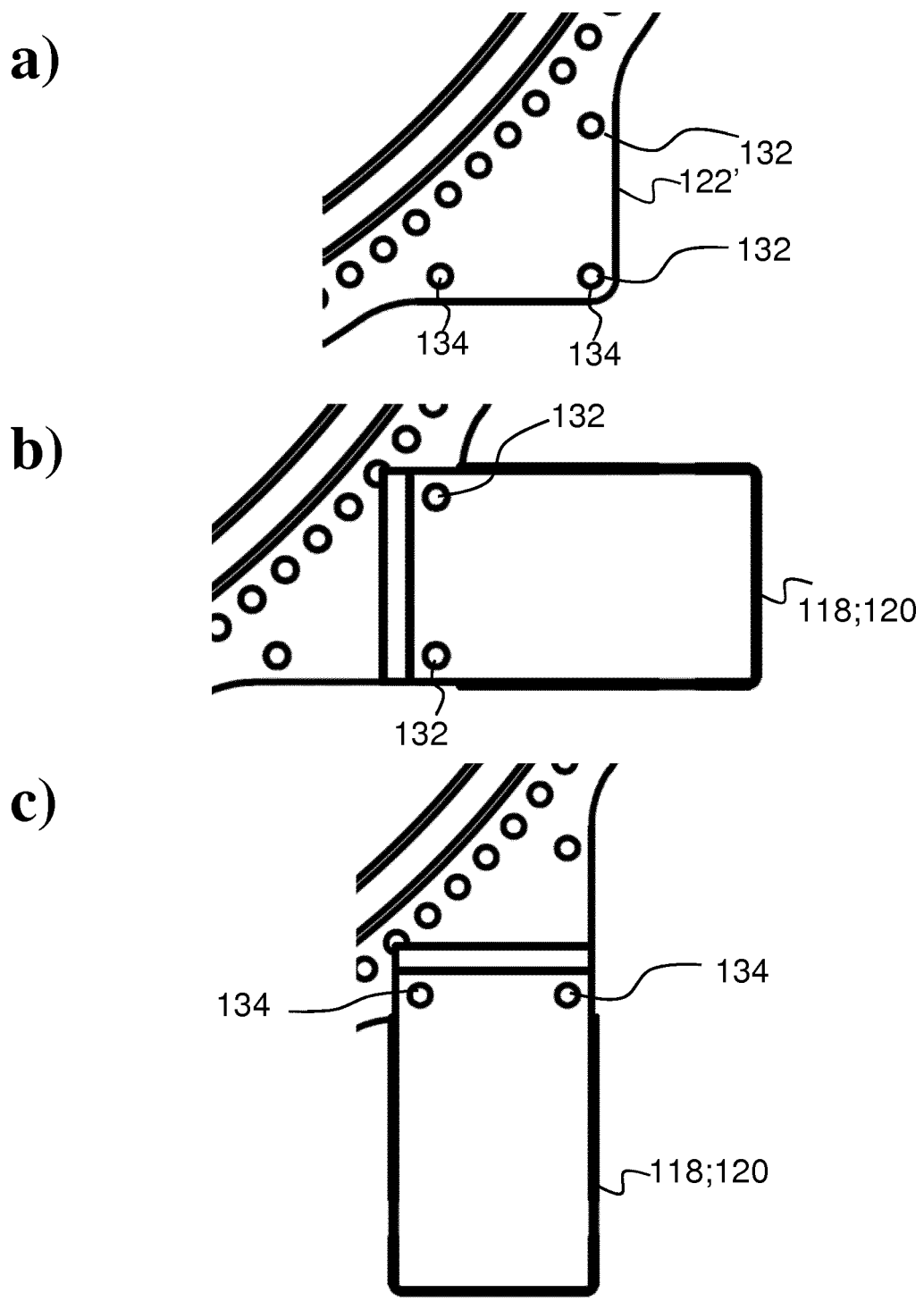
FIG. 5a-c schematically illustrates an exemplary support attachment element.

The plurality of support attachment elements 122, such as the first support attachment element 124, the second support attachment element 126, the third support attachment element 128 and the fourth support attachment element 130, are equidistantly spaced along an outer perimeter of the root end element 100, e.g. by an attachment spacing angle, such as 90 degrees. For example, an attachment spacing angle between the first support attachment element 124 and the second support attachment element 126 may be 90 degrees, an attachment spacing angle between the second support attachment element 126 and the third support attachment element 128 may be less 90 degrees, an attachment spacing angle between the third support attachment element 128 and the fourth support attachment element 130 may be 90 degrees, and an attachment spacing angle between the fourth support attachment element 130 and the first support attachment element 124 may be 90 degrees. The support attachment elements 122 are further described with respect to FIG. 5.

The root end element 100 comprises a plurality of manipulator attachment points 140;142;144 including a first manipulator attachment point 140, a second manipulator attachment point 142 and a third manipulator attachment point 144. The plurality of manipulator attachment points 140;142;144 are configured for cooperation with a root end interface of a root end manipulator, such as the root end manipulator 200' as described in relation to FIG. 9. The plurality of manipulator attachment points 140;142;144 is positioned along a manipulator attachment point circle in the root end element plane. The manipulator attachment point circle is smaller than the attachment point circle formed by the plurality of attachment points 102,104,106,108.

The root end element 100 comprises a lifting ring 136. The lifting ring 136 is configured for connection to a lifting arrangement, such as a crane. Hence, the lifting ring 136 may be provided for lifting the wind turbine blade, such as the root end of the wind turbine blade, by the root end element 100.

Figure 4B:
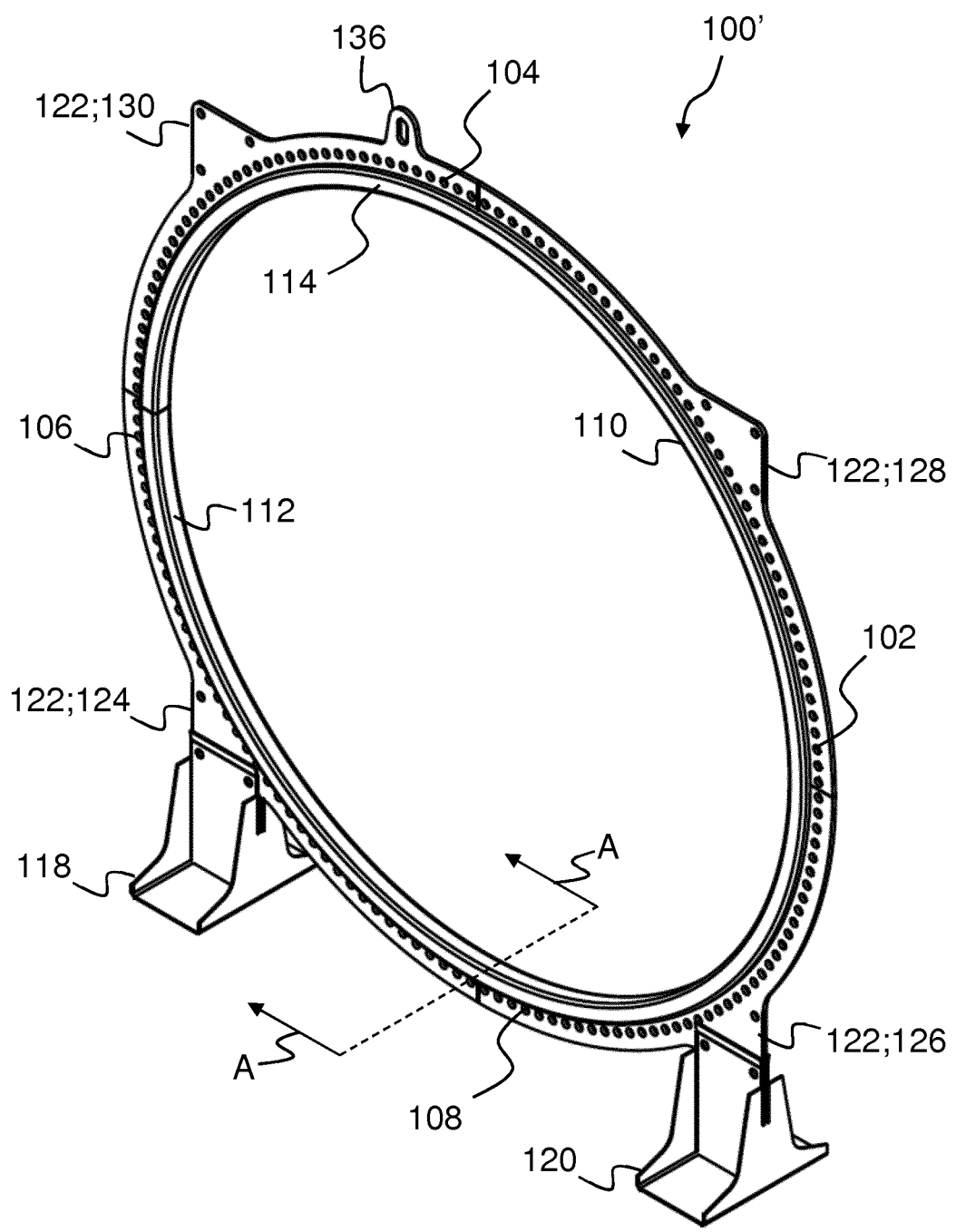
FIG. 4b schematically illustrates an exemplary root end element.

FIG. 4b schematically illustrates an exemplary root end element 100'. The root end element 100' is configured for attachment to a root end of a wind turbine blade, such as the root end of FIG. 3. The root end element 100' extends in a root end element plane. The root end element 100' may be configured such that the root end element plane is parallel and/or coinciding with the root end plane of the root end, when the root end element 100' is attached to the root end.

The root end element 100' comprises a plurality of attachment points 102;104;106;108. The plurality of attachment points 102,104,106,108 is configured for attachment to the root end. For example, the plurality of attachment points 102,104,106,108 are configured for attachment to the bolt attachments 56 of the root end 17 (see FIG. 3). The plurality of attachment points 102,104,106,108 are positioned along an attachment point circle in the root end element plane. The attachment point circle may have a diameter equal to the bolt circle diameter (BCD) 58 of the root end 17 (see FIG. 3).

The plurality of attachment points 102,104,106,108 includes a first attachment point 102, a second attachment point 104, a third attachment point 106 and a fourth attachment point 108. The plurality of attachment points may include more attachment points, as shown.

The first attachment point 102, the second attachment point 104, the third attachment point 106 and the fourth attachment point 108 may be spaced equidistantly along the attachment point circle. For example, an angular distance between the first attachment point 102 and the second attachment point 104 may be 90 degrees, an angular distance between the second attachment point 104 and the third attachment point 106 may be less 90 degrees, an angular distance between the third attachment point 106 and the fourth attachment point 108 may be 90 degrees, and an angular distance between the fourth attachment point 108 and the first attachment point 102 may be 90 degrees.

The root end element 100' comprises supports 118,120 including a first support 118 and a second support 120. The first support 118 and the second support 120 are configured to contact the ground and prevent a lowest point of the root end from contacting the ground.

The root end element 100' comprises a plurality of support attachment elements 122. The plurality of support attachment elements 122 is configured for connecting the first support 118 and the second support 120. The plurality of support attachment elements 122 includes a first support attachment element 124, a second support attachment element 126, a third support attachment element 128 and a fourth support attachment element 130.

The plurality of support attachment elements 122, such as the first support attachment element 124, the second support attachment element 126, the third support attachment element 128 and the fourth support attachment element 130, are equidistantly spaced along an outer perimeter of the root end element 100', e.g. by an attachment spacing angle, such as 90 degrees. For example, an attachment spacing angle between the first support attachment element 124 and the second support attachment element 126 may be 90 degrees, an attachment spacing angle between the second support attachment element 126 and the third support attachment element 128 may be less 90 degrees, an attachment spacing angle between the third support attachment element 128 and the fourth support attachment element 130 may be 90 degrees, and an attachment spacing angle between the fourth support attachment element 130 and the first support attachment element 124 may be 90 degrees. The support attachment elements 122 are further described with respect to FIG. 5.

The root end element 100' comprises an inner rim 110. The inner rim 110 forms an inner rim circle in the root end element plane. The inner rim 110 comprises an inner rim surface 112, a first inner rim surface 114 and a second inner rim surface 116 (not visible). The inner rim 110 is further described with respect to FIG. 6. The inner rim 110 forms continuous manipulator attachment points, e.g. comprising a plurality of manipulator attachment points as exemplified in FIG. 4a. The inner rim 110 is configured for cooperation with a root end interface of a root end manipulator, such as the root end manipulator 200 as described in relation to FIGS. 7 and 8.

The root end element 100' comprises a lifting ring 136. The lifting ring 136 is configured for connection to a lifting arrangement, such as a crane. Hence, the lifting ring 136 may be provided for lifting the wind turbine blade, such as the root end of the wind turbine blade, by the root end element 100'.

FIG. 5a-c schematically illustrates an exemplary support attachment element 122' and attached support 118;120. The support attachment element 122' of FIG. 5a-c may be all or any of the support attachment elements 122 as described in relation to FIGS. 4a and 4b.

The support attachment elements 122' comprises first support attachment points 132 and second support attachment points 134. One of the first support attachment points 132 may be one of the second support attachment points 134, as illustrated.

The support attachment elements 122' comprises a plurality of support attachment configurations formed by the first and second support attachment points 132; 134. For example, a first support attachment configuration is formed by the first support attachment points 132 and a second support attachment configuration is formed by the second support attachment points 134.

The plurality of support attachment configurations provides for connecting the supports 118;120 in a plurality of directions. For example, the first support attachment configuration formed by the first support attachment points 132 is configured to connect the supports 118;120 in a first direction, as shown in FIG. 5b. The second support attachment configuration formed by the second support attachment points 134 is configured to connect the supports 118;120 in a second direction, as shown in FIG. 5c. The first direction and the second direction may be separated by an angle, such as 90 degrees. The first direction and the second direction may be separated by an angle equal to the attachment spacing angle as mentioned in relation to FIGS. 4a and 4b.

Figure 6:
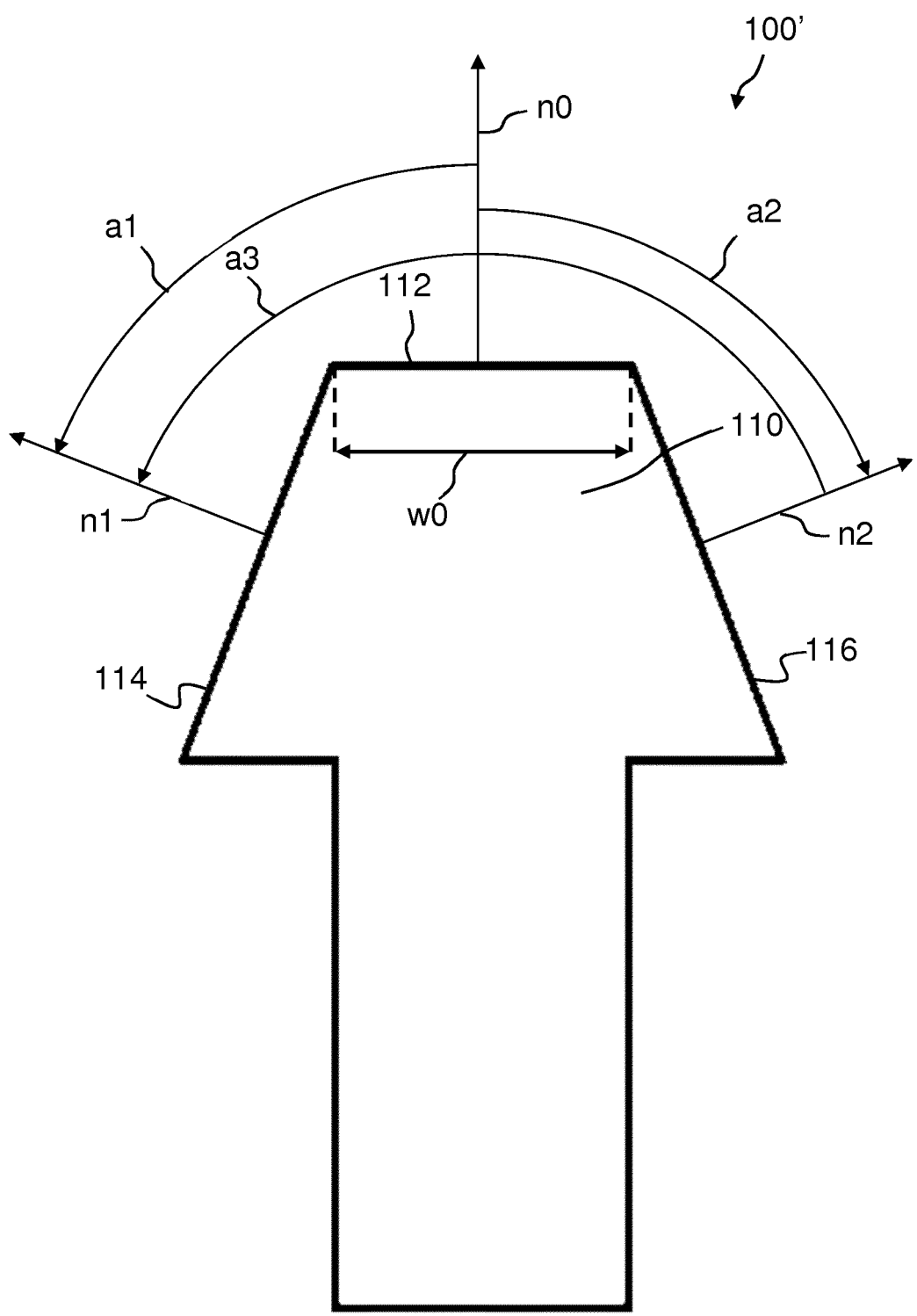
FIG. 6 schematically illustrates a cross section of the root end element.

FIG. 6 schematically illustrates a cross section of the root end element 100', perpendicular to the root end element plane, as indicated by the line A-A in FIG. 4b The root end element 100' comprises an inner rim 110. The inner rim 110 comprises an inner rim surface 112, a first inner rim surface 114 and a second inner rim surface 116.

The inner rim surface 112 has an inner rim surface normal n0. The inner rim surface normal n0 is in the root end element plane and/or parallel to the root end element plane. The inner rim surface 112 has a width w0 perpendicular to the root end element plane.

The first inner rim surface 114 has a first inner rim surface normal n1. The first inner rim surface normal n1 spans a first angle a1 with the root end element plane and/or the inner rim surface normal n0. The first angle a1 may be 80 degrees.

The second inner rim surface 116 has a second inner rim surface normal n2. The second inner rim surface normal n2 spans a second angle a2 with the root end element plane and/or the inner rim surface normal n0. The second angle a2 may be between −45 and −90 degrees, such as −80 degrees.

A third angle a3 extends between the first inner rim surface normal n1 and the second inner rim surface normal n2. The third angle a3 may be between 90 and 180 degrees, such as 160 degrees.

Figure 7:
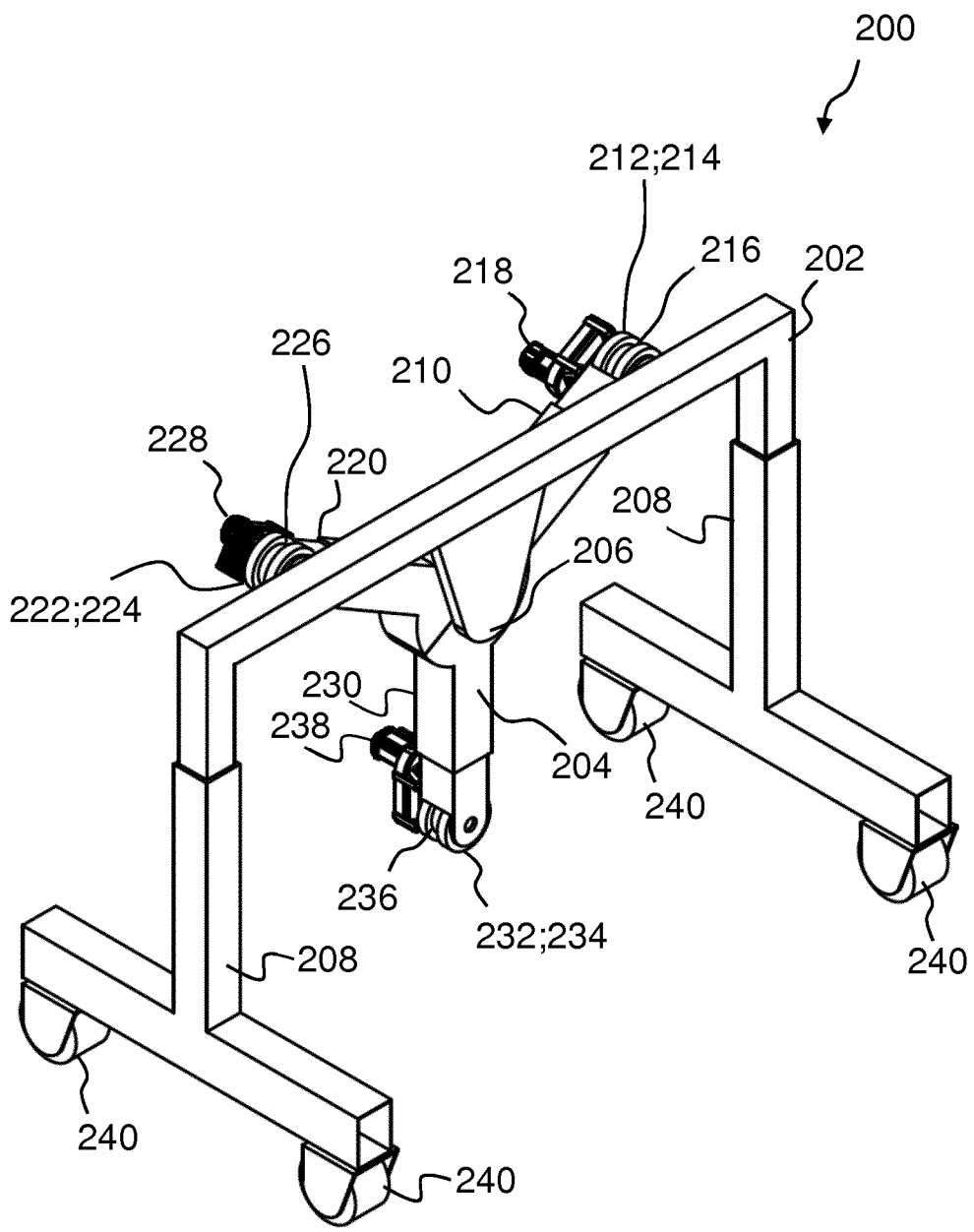
FIG. 7 schematically illustrates an exemplary root end manipulator.

FIG. 7 schematically illustrates an exemplary root end manipulator 200. The root end manipulator 200 is configured to manipulate, such as rotate and/or elevate, a wind turbine blade, such as the wind turbine 10 of FIG. 2.

The root end manipulator 200 comprises a base structure 202 configured to contact the ground and a root end interface 204. The root end interface 204 is connected to the base structure 202.

The root end interface 204 comprises interface elements 210;220;230 including a first interface element 210, a second interface element 220 and a third interface element 230. The first interface element 210, the second interface element 220 and the third interface element 230 are equidistantly spaced, e.g. by an interface element spacing angle, such as 120 degrees.

The interface elements 210;220;230 are adjustable between a retracted configuration and an extended configuration. The interface elements 210;220;230 are configured to extend such that a primary end 212;222;232 abuts the inner root surface 52 of wind turbine blade (see FIG. 3). Alternatively or additionally, the interface elements 210;220;230 are configured to extend such that the primary ends 212; 222;232 abut or attaches to a root end element (see FIGS. 4a and 4b) attached to the root end. In another exemplary root end manipulator, the root end interface may be configured to attach directly to the root end of the wind turbine blade, such as the root end surface 50 of the wind turbine blade (see FIG. 3).

The interface elements 210;220;230 each comprises an interface wheel 214;224;234 positioned at the primary end 212;222;232. The first interface element 210 comprises a first interface wheel 214 positioned at the first primary end 212. The second interface element 220 comprises a second interface wheel 224 positioned at the second primary end 222. The third interface element 230 comprises a third interface wheel 234 positioned at the third primary end 232.

In other exemplary root end manipulators, the root end interface 204 may comprise only one or two interface elements, such as the first interface element 210 and/or the second interface element 220.

The interface wheels 214;224;234 may be groove wheels, as shown. Thus, the first interface wheel 214 comprises a first interface groove 216. The second interface wheel 224 comprises a second interface groove 226. The third interface wheel 234 comprises a third interface groove 236. The interface grooves 216;226;236 are configured to cooperate with the inner rim of the root end element (see FIG. 8). Providing the interface grooves 216;226;236 provides that the root end manipulator 200 may be used to push and/or pull the wind turbine blade in a longitudinal direction along the longitudinal axis L of the wind turbine blade (see FIG. 2).

The root end interface 204 comprises a first interface motor 218 configured to rotate the first interface wheel 214, a second interface motor 228 configured to rotate the second interface wheel 224, and a third interface motor 238 configured to rotate the third interface wheel 234. In other exemplary root end manipulators, the root end interface may comprise a single interface motor configured to rotate one or more of the interface wheels. The interface motors 218;228;238 may provide rotation in order to rotate the wind turbine blade.

The root end interface 204 may be rotatable relative to the base structure 202, and the root end manipulator 200 may comprise an optional base motor 206 for rotating the root end interface 204 relative to the base structure 202. The base motor 206 may be provided for rotation of the root end interface 204 during positioning before engaging with the root end or root end element. Alternatively or additionally, the base motor 206 may be provided for rotating the wind turbine blade by rotation of the root end interface 204.

The root end manipulator 200 comprises vertically extending root elements 208. The root elements 208 are adjustable between a low configuration and a high configuration. Thereby, the vertical position of the root end interface may be altered, such as to raise or lower the root end of the wind turbine blade.

The base structure 202 comprises base wheels 240. The base wheels 240 facilitates translational movement of the wind turbine blade, such as the root end of the wind turbine blade. The base wheels 240 may be motorized.

Figure 8:
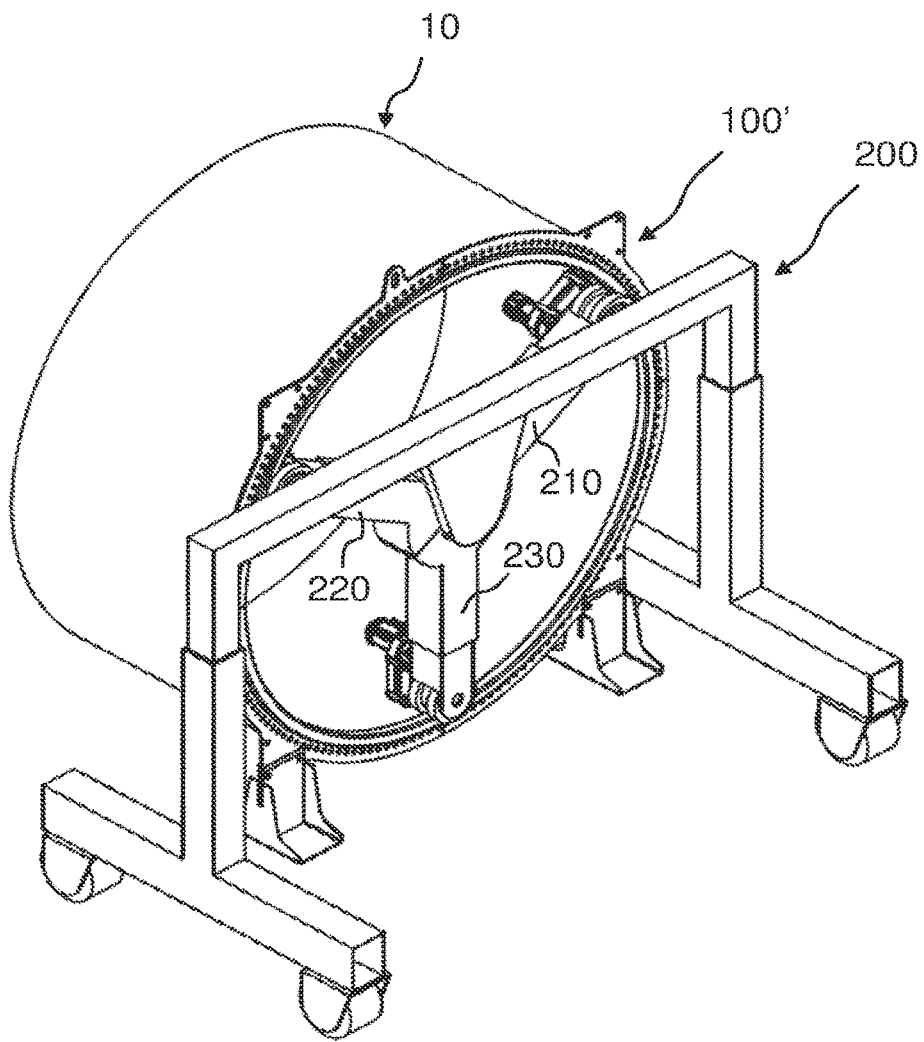
FIG. 8 schematically illustrates an exemplary root end manipulator.

FIG. 8 schematically illustrates an exemplary root end manipulator 200, such as the root end manipulator 200 of FIG. 7, being engaged with an exemplary root end element 100', such as the root end element 100' of FIG. 4b, and wherein the root end element 100' is attached to the root end of a wind turbine blade 10 (only partially shown).

As seen, providing a plurality of interface elements, such as the first interface element 210, the second interface element 220 and the third interface element 230, as illustrated, facilitates that a force provided by one interface element, such as the first interface element 210, in a first direction on the root end element 100', may be counteracted by other interface elements, such as the second interface element 220 and the third interface element 230, providing a force in a second direction, i.e. opposite the first direction, on the root end element 100'. Thereby, friction between the interface elements 210;220;230 and the root end element 100' may be increased. Thus, risk of unintentional slipping between the interface elements 210;220;230 and root end element 100' may be decreased, and positioning and orientation of the wind turbine blade 10 may be more securely controlled.

Figure 9:
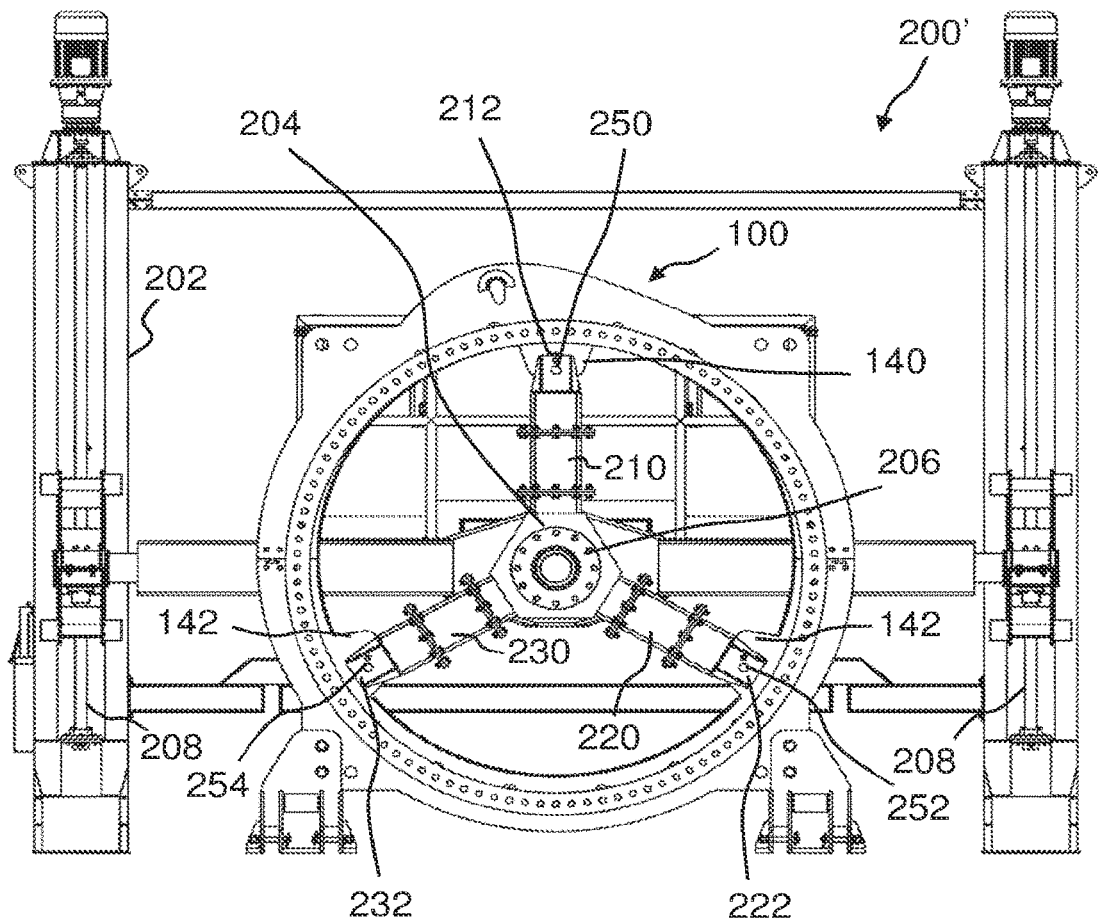
FIG. 9 schematically illustrates an exemplary root end manipulator.

FIG. 9 schematically illustrates an exemplary root end manipulator 200', being engaged with an exemplary root end element 100, such as the root end element 100 of FIG. 4a. The root end manipulator 200' is configured to manipulate, such as rotate and/or elevate, a wind turbine blade, such as the wind turbine 10 of FIG. 2.

The root end manipulator 200' comprises a base structure 202 configured to contact the ground and a root end interface 204. The root end interface 204 is connected to the base structure 202.

The root end interface 204 comprise interface elements 210;220;230 including a first interface element 210, a second interface element 220 and a third interface element 230. The first interface element 210, the second interface element 220 and the third interface element 230 are equidistantly spaced, e.g. by an interface element spacing angle, such as 120 degrees.

The interface elements 210;220;230 are adjustable between a retracted configuration and an extended configuration. For example, by replacing an intermediate section of the interface element with another intermediate section having a different length.

The interface elements 210;220;230 are configured to attach to the root end element 100, such as to manipulator attachment points 140;142;144 of the root end element 100. In another exemplary root end manipulator, the root end interface 204, such as the interface elements 210;220;230, may be configured to attach directly to the root end, such as the root end surface, of the wind turbine blade.

The interface elements 210;220;230 each comprises a fastening element 250;252;254 positioned at the primary end 212;222;232. The first interface element 210 comprises a first fastening element 250 positioned at the first primary end 212. The second interface element 220 comprises a second fastening element 252 positioned at the second primary end 222. The third interface element 230 comprises a third fastening element 254 positioned at the third primary end 232.

In other exemplary root manipulators, the root end interface 204 may comprise only one or two interface elements, such as the first interface element 210 and/or the second interface element 220.

The fastening elements 250;252;254 may comprise a first part and a second part, e.g. forming a groove, such as to position the manipulator attachment point 140;142;144 in the grove formed between the first part and the second part of the fastening element.

The fastening elements 250;252;254 may comprise a hole as shown, such as to receive a pin or a bolt or similar, such as to fasten and/or lock the interface element 210;220;230 to the manipulator attachment point 140;142;144 of the root end element 100.

The root end interface 204 is rotatable relative to the base structure 202, and the root end manipulator 200' comprises a base motor 206 for rotating the root end interface 204 relative to the base structure 202. The base motor 206 is provided for rotating the wind turbine blade by rotation of the root end interface 204. The base motor 206 may furthermore be provided for rotation of the root end interface 204 during positioning before engaging with the root end element 100.

The root end manipulator 200' comprises vertically extending root elements 208. The root elements 208 are adjustable between a low configuration and a high configuration. Thereby, the vertical position of the root end interface may be altered, such as to raise or lower the root end of the wind turbine blade.

Although not visible, the base structure 202 of the root end manipulator 200' may comprise base wheels, such as motorized base wheels, e.g. to facilitate translational movement of the wind turbine blade, such as the root end of the wind turbine blade.

Figure 10:
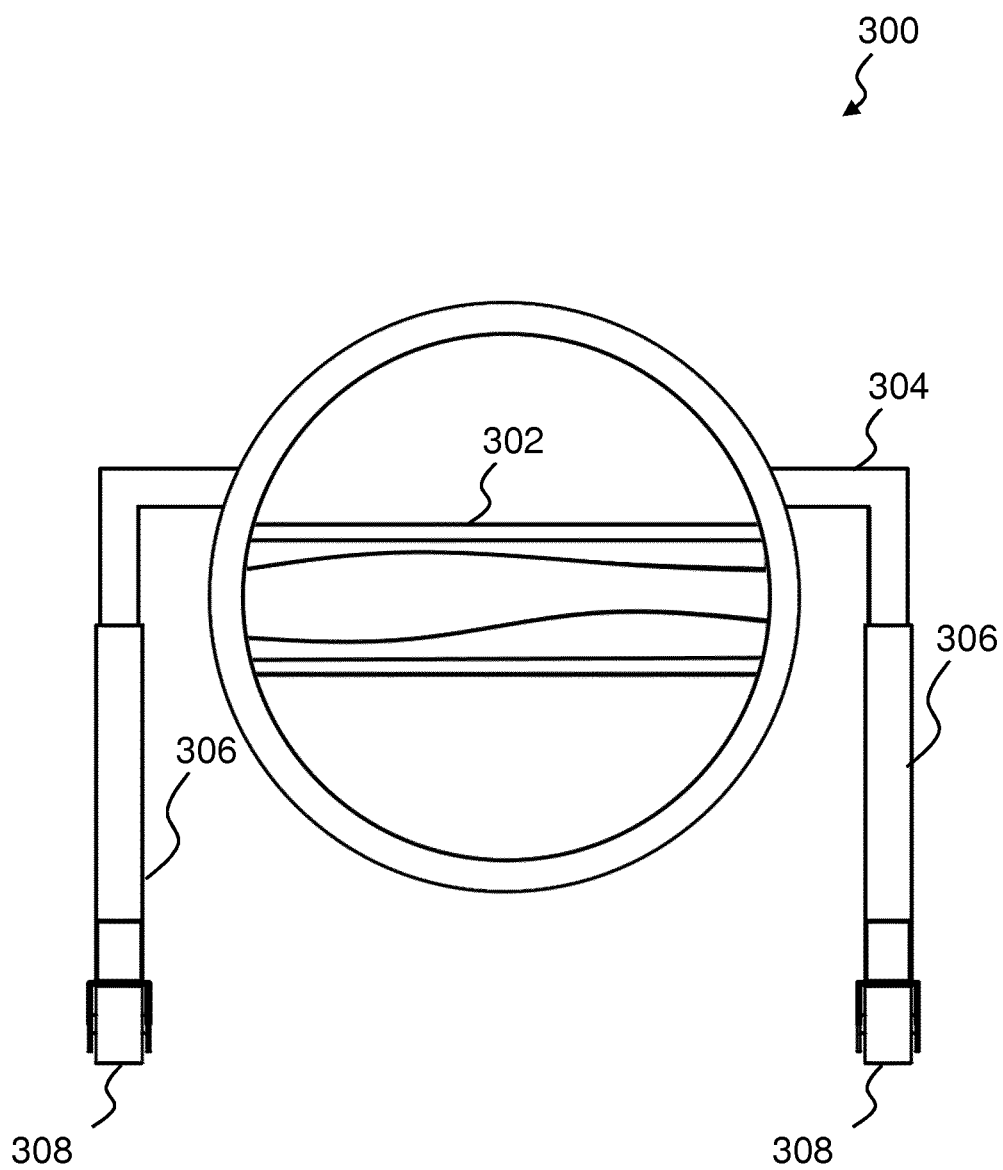
FIG. 10 schematically illustrates an exemplary tip end structure.

FIG. 10 schematically illustrates an exemplary tip end structure 300. The tip end structure 300 is configured to support the airfoil region 34 of the wind turbine blade 10 (see FIG. 2). The tip end structure 300 may be provided in combination with the root end manipulator 200 (see FIGS. 7, 8 and 9) and optionally the root end element 100, 100' (see. FIGS. 4a and 4b), e.g. to form a blade manipulation system.

The tip end structure 300 comprises a tip end clamp part 302 configured to be secured to the airfoil region of the wind turbine blade. The tip end structure 300 comprises a tip end base structure 304 configured to contact the ground. The tip end clamp part 302 is pivotably connected to the tip end base structure 304. Thereby the wind turbine blade may be rotated, e.g. by a root end manipulator.

The tip end structure 300 comprises tip end base wheels 308. The tip end base wheels 308 facilitates translational movement of the wind turbine blade, such as the airfoil region of the wind turbine blade.

The tip end base structure 304 comprises vertically extending tip elements 306. The vertically extending tip elements 306 are adjustable between a low configuration and a high configuration. Thereby a vertical position of the tip end clamp part 302 and thereby the airfoil region of the wind turbine blade, may be altered.

Figure 11:
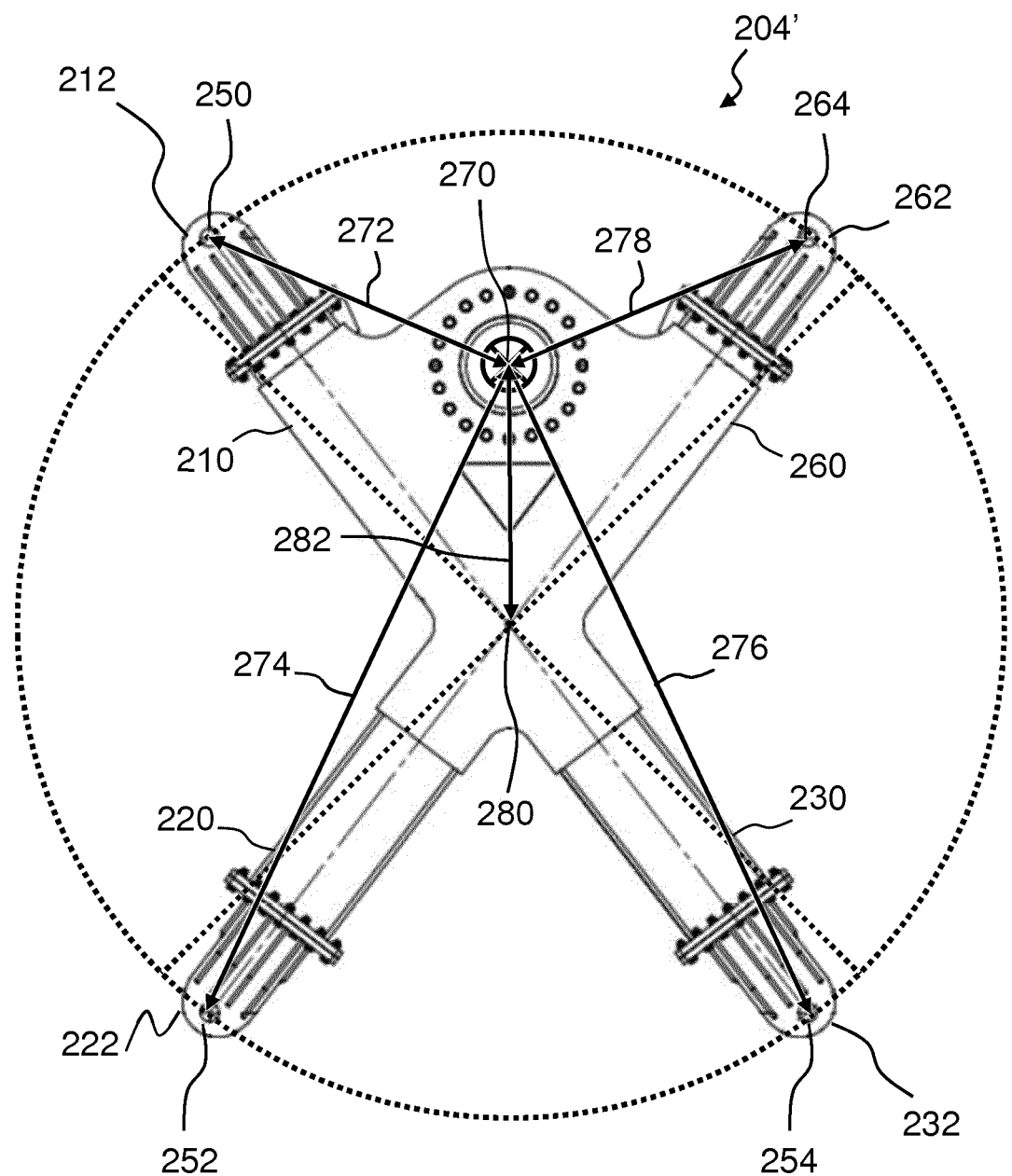
FIG. 11 schematically illustrates an exemplary root end interface.

FIG. 11 schematically illustrates another exemplary root end interface 204', such as a root end interface 204' to form part of an exemplary root end manipulator, such as the root end manipulator 200' as illustrated in FIG. 9.

The root end interface 204' comprises four interface elements 210;220;230;260 including a first interface element 210, a second interface element 220, a third interface element 230, and a fourth interface element 260. The root end interface 204' may be configured to cooperate with a root end element, such as the root end element 100 of FIG. 4a, being adapted to additionally comprise a fourth manipulator attachment point.

The first interface element 210 and the second interface element 220 are spaced by a first interface element spacing angle, e.g. 100 degrees. The second interface element 220 and the third interface element 230 are spaced by a second interface element spacing angle, e.g. 80 degrees. The third interface element 230 and the fourth interface element 260 are spaced by a third interface element spacing angle, e.g. 100 degrees. The fourth interface element 260 and the first interface element 210 are spaced by a fourth interface element spacing angle, e.g. 80 degrees.

As also described with respect to the root end interface 204 of FIG. 9, the interface elements 210;220;230;260 may be adjustable between a retracted configuration and an extended configuration. For example, by replacing an intermediate section of the interface element 210;220;230;260 with another intermediate section having a different length.

The interface elements 210;220;230;260 each comprises a fastening element 250;252;254;264 positioned at the primary end 212;222;232;262. The first interface element 210 comprises a first fastening element 250 positioned at the first primary end 212. The second interface element 220 comprises a second fastening element 252 positioned at the second primary end 222. The third interface element 230 comprises a third fastening element 254 positioned at the third primary end 232. The fourth interface element 260 comprises a fourth fastening element 264 positioned at the fourth primary end 262. The fastening elements 250;252; 254 may, e.g., form a groove or a hole.

The root end interface 204' is rotatable relative to the base structure about a rotation axis 270. The rotation axis 270 is configured to be substantially parallel to the longitudinal axis of the wind turbine blade, such that rotation about the rotation axis 270 results in turning of the wind turbine blade about its longitudinal axis. The rotation axis 270 is a first rotation distance 272 from the first primary end 212. The rotation axis 270 is a second rotation distance 274 from the second primary end 222. The rotation axis 270 is a third rotation distance 276 from the third primary end 232. The rotation axis 270 is a fourth rotation distance 278 from the fourth primary end 262.

The rotation axis 270, as illustrated by the example, may be offset by a first radial distance 282 from a centre 280 of the root end interface 204', which may correspond to a centre of the root end surface of the wind turbine blade. Hence, the first rotation distance 272 is smaller than the second rotation distance 274. The rotation axis 270 may be configured to be substantially coincident with the centre of mass of the wind turbine blade. By offsetting the rotation axis 270 from the centre 280 of the root end interface 204' turning of the wind turbine blade may be made easier and range of motion of the tip end of the wind turbine blade may be reduced. It is emphasized that the offsetting of the rotation axis 270 as illustrated is not specifically linked to the number of interface elements 210;220;230;260, and may equally be employed with, e.g., the root end interface 204 of FIG. 9.

Exemplary root end elements, root end manipulators, and blade manipulations systems are disclosed in the following items:

1. A root end element for attachment to a root end of a wind turbine blade having a longitudinal axis and comprising the root end, a root region, an airfoil region with a tip, a pressure side, a suction side and a chord line extending between a leading edge and a trailing edge, the root end having a root end surface an inner root surface, and an outer root surface, the root end surface being ring formed in a root end plane substantially perpendicular to the longitudinal axis, the root end element comprising a plurality of attachment points for attachment to the root end, the attachment points being positioned along an attachment point circle in a root end element plane, the root end element being configured to support the root end of the wind turbine blade.

2. Root end element according to item 1 comprising a first manipulator attachment point configured for cooperation with a root end interface of a root end manipulator.

3. Root end element according to item 2 comprising a plurality of manipulator attachment points including the first manipulator attachment point, a second manipulator attachment point and a third manipulator attachment point, the plurality of manipulator attachment points being positioned along a manipulator attachment point circle in the root end element plane.

4. Root end element according to item 3, wherein the manipulator attachment point circle is smaller than the attachment point circle.

5. Root end element according to any of the preceding items comprising an inner rim forming an inner rim circle in the root end element plane,
   the inner rim comprising an inner rim surface with an inner rim surface normal in the root end element plane, the inner rim surface having a width perpendicular to the root end element plane,
   the inner rim comprising a first inner rim surface with a first inner rim surface normal spanning a first angle with the root end element plane,
   the inner rim comprising a second inner rim surface with a second inner rim surface normal spanning a second angle with the root end element plane.

6. Root end element according to item 5 as dependent on any of items 3 or 4, wherein the inner rim forms continuous manipulator attachment points comprising the plurality of manipulator attachment points.

7. Root end element according to any of items 5-6, wherein the first angle is between 45 and 90 degrees, and the second angle is between −45 and −90 degrees.

8. Root end element according to any of the preceding items, wherein the plurality of attachment points comprising a first attachment point, a second attachment point and a third attachment point, an angular distance between the first attachment point and the second attachment point in the attachment point circle and an angular distance between the second attachment point and the third attachment point in the attachment point circle are substantially the same as an angular distance between the third attachment point and the first attachment point in the attachment point circle.

9. Root end element according to any of the preceding items comprising a first support and a second support being configured to contact the ground and prevent a lowest point of the root end from contacting the ground.

10. Root end element according to any of the preceding items comprising a plurality of support attachment elements, the plurality of support attachment elements being configured for connection with a first support and a second support configured to contact the ground and prevent a lowest point of the root end from contacting the ground.

11. Root end element according to item 10, wherein the plurality of support attachment elements are equidistantly spaced along an outer perimeter of the root end element, and wherein the support attachment elements are spaced by an attachment spacing angle.

12. Root end element according to any of items 10-11, wherein the plurality of support attachment elements comprises a first support attachment configuration configured to connect the first support or the second support in a first direction, and the support attachment elements comprises a second support attachment configuration configured to connect the first support or the second support in a second direction.

13. Root end element according to item 12 as dependent on item 11, the first direction and the second direction being separated by the attachment spacing angle.

14. Root end element according to any of items 10-13, wherein the plurality of support attachment elements comprising four support attachment elements.

15. Root end element according to any of the preceding items comprising a lifting ring configured for connection to a lifting arrangement, such as a crane.

16. A root end manipulator configured to manipulate, such as rotate and/or elevate, a wind turbine blade having a longitudinal axis and comprising a root end, a root region, an airfoil region with a tip, a pressure side, a suction side and a chord line extending between a leading edge and a trailing edge, the root end having a root end surface an inner root surface and an outer root surface, the root end surface being ring formed in a root end plane substantially perpendicular to the longitudinal axis,
   the root end manipulator comprising a base structure configured to contact the ground and a root end interface connected to the base structure,
   the root end interface being configured to attach to the root end surface or the inner root surface of the root end.

17. A root end manipulator configured to manipulate, such as rotate and/or elevate, a wind turbine blade having a longitudinal axis and comprising a root end, a root region, an airfoil region with a tip, a pressure side, a suction side and a chord line extending between a leading edge and a trailing edge, the root end having a root end surface an inner root surface, and an outer root surface, the root end surface being ring formed in a root end plane substantially perpendicular to the longitudinal axis,
   the root end manipulator comprising a base structure configured to contact the ground and a root end interface connected to the base structure,
   the root end interface being configured for cooperation with a root end element attached to the root end of the wind turbine blade.

18. Root end manipulator according to item 17, wherein the root end interface comprises a first interface element having a first primary end configured for the cooperation with the root end element.

19. Root end manipulator according to item 18, wherein the first interface element is adjustable between a retracted configuration and an extended configuration.

20. Root end manipulator according to any of items 18-19, wherein the first interface element comprises a fastening element at the first primary end configured for fastening the first interface element to a manipulator attachment point of the root end element.

21. Root end manipulator according to any of items 18-19, wherein the first interface element comprises a first interface wheel positioned at the first primary end.

22. Root end manipulator according to item 21, wherein the first interface wheel is a groove wheel having a first interface groove, and wherein the first interface groove is configured to cooperate with an inner rim of the root end element.

23. Root end manipulator according to any of items 21-22, wherein the root end interface comprises an interface motor configured to rotate the first interface wheel.

24. Root end manipulator according to any of items 18-23, wherein the root end interface comprises a plurality of interface elements comprising the first interface element, a second interface element and third interface element, wherein the first interface element, the second interface element and the third interface element are equidistantly spaced by an interface element spacing angle.

25. Root end manipulator according to any of items 16-24, wherein the root end interface is rotatable relative to the base structure, and the root end manipulator comprises a base motor for rotating the root end interface relative to the base structure.

26. Root end manipulator according to any of items 16-25 comprising one or more vertically extending root elements adjustable between a low configuration and a high configuration, such as to alter the vertical position of the root end interface.

27. A blade manipulation system comprising a root end element according to any of items 1-15 and a root end manipulator according to any of items 16-26.

28. Blade manipulation system according to item 27 comprising a tip end structure configured to support the airfoil region of the wind turbine blade, the tip end structure comprising a tip end clamp part configured to be secured to the airfoil region and tip end base structure configured to contact the ground, the tip end clamp part being pivotably connected to the tip end base structure.

29. Blade manipulation system according to item 28, wherein the tip end base structure comprises one or more vertically extending tip elements adjustable between a low configuration and a high configuration, such as to alter the vertical position of the tip end clamp part.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part
26 second blade shell part
28 bond lines/glue joints
30 root region
32 transition region
34 airfoil region
50 root end surface
52 inner root surface
54 outer root surface
56 bolt attachments
58 bolt circle diameter
60 inner root diameter
62 outer root diameter
100 root end element
102 first attachment point
104 second attachment point
106 third attachment point
108 fourth attachment point
110 inner rim
112 inner rim surface
114 first inner rim surface
116 second inner rim surface
118 first support
120 second support
122 support attachment element(s)
124 first support attachment element
126 second support attachment element
128 third support attachment element
130 fourth support attachment element
132 first support attachment point(s)
134 second support attachment point(s)
136 lifting ring
140 first manipulator attachment point
142 second manipulator attachment point
144 third manipulator attachment point
200 root end manipulator
202 base structure
204 root end interface
206 base motor
208 vertically extending root element(s)
210 first interface element
212 first primary end
214 first interface wheel
216 first interface groove
218 first interface motor
220 second interface element
222 second primary end
224 second interface wheel
226 second interface groove
228 second interface motor
230 third interface element
232 third primary end
234 third interface wheel
236 third interface groove
238 third interface motor
240 base wheel(s)
250 first fastening element
252 second fastening element
254 third fastening element
260 fourth interface element
262 fourth primary end
264 fourth fastening element
270 rotation axis
272 first rotation distance
274 second rotation distance
276 third rotation distance
278 fourth rotation distance
280 centre of the root end interface
300 tip end structure
302 tip end clamp part
304 tip end base structure
306 vertically extending tip element(s)
308 tip end base wheels
$n0$ inner rim surface normal
$n1$ first inner rim surface normal
$n2$ second inner rim surface normal
$a1$ first angle
$a2$ second angle
$a3$ third angle
$w0$ width of inner rim surface
$L$ longitudinal axis

The invention claimed is:

1. A root end element for attachment to a root end of a wind turbine blade having a longitudinal axis and comprising the root end, a root region, an airfoil region with a tip, a pressure side, a suction side and a chord line extending between a leading edge and a trailing edge; the root end having a root end surface, an inner root surface, and an outer root surface, the root end surface being ring formed in a root end plane substantially perpendicular to the longitudinal axis, the root end element comprising:
   a plurality of attachment points for attachment to the root end, the plurality of attachment points being positioned along an attachment point circle in a root end element plane; and
   a plurality of manipulator attachment points configured for cooperation with a root end interface of a root end manipulator, the plurality of manipulator attachment points including a first manipulator attachment point, a second manipulator attachment point and a third manipulator attachment point, the plurality of manipulator attachment points being positioned along a manipulator attachment point circle in the root end element plane, wherein the manipulator attachment point circle is smaller than the attachment point circle, and wherein the root end element is configured to support the root end of the wind turbine blade.

2. The root end element according to claim 1, further comprising an inner rim forming an inner rim circle in the root end element plane, wherein the inner rim comprises an inner rim surface with an inner rim surface normal in the root end element plane, the inner rim surface having a width perpendicular to the root end element plane, wherein the inner rim comprises a first inner rim surface with a first inner rim surface normal spanning a first angle with the root end element plane, and wherein the inner rim comprises a second inner rim surface with a second inner rim surface normal spanning a second angle with the root end element plane.

3. The root end element according to claim 2, wherein the first angle is between 45 and 90 degrees, and the second angle is between −45 and −90 degrees.

4. The root end element according to claim 1, further comprising a first support and a second support being configured to contact the ground and prevent a lowest point of the root end from contacting the ground.

5. The root end element according to claim 1, further comprising a plurality of support attachment elements, the plurality of support attachment elements being configured for connection with a first support and a second support configured to contact the ground and prevent a lowest point of the root end from contacting the ground.

6. A root end manipulator configured to manipulate, such as rotate and/or elevate, a wind turbine blade having a longitudinal axis and comprising a root end, a root region, an airfoil region with a tip, a pressure side, a suction side and a chord line extending between a leading edge and a trailing edge; the root end having a root end surface, an inner root surface, and an outer root surface, the root end surface being ring formed in a root end plane substantially perpendicular to the longitudinal axis; the root end manipulator comprising:

a base structure configured to contact the ground and a root end interface connected to the base structure, wherein the root end interface is configured for cooperation with a root end element attached to the root end of the wind turbine blade, wherein the root end interface comprises a first interface element having a first primary end configured for the cooperation with the root end element, wherein the first interface element comprises a fastening element at the first primary end configured for fastening the first interface element to a manipulator attachment point of the root end element, and wherein the fastening element comprises a hole for receiving a pin to extend through a respective hole of the root end element.

7. The root end manipulator according to claim 6, wherein the first interface element is adjustable between a retracted configuration and an extended configuration.

8. The root end manipulator according to claim 6, wherein the root end interface comprises a plurality of interface elements comprising the first interface element, a second interface element and third interface element.

9. The root end manipulator according to claim 8, wherein the plurality of interface elements are equidistantly spaced by an interface element spacing angle.

10. The root end manipulator according to claim 8, wherein the root end interface is rotatable about a rotation axis configured to be substantially parallel to the longitudinal axis of the wind turbine blade, wherein a first rotation distance from the rotation axis to the first primary end of the first interface element is smaller than a second rotation distance from the rotation axis to a second primary end of the second interface element, and wherein the root end interface is rotatable relative to the base structure.

11. The root end manipulator according to claim 10, wherein the rotation axis is configured to be substantially coincident with the centre of mass of the wind turbine blade.

12. The root end manipulator according to claim 6, wherein the root end interface is rotatable relative to the base structure.

13. The root end manipulator according to claim 12, wherein the root end manipulator comprises a base motor for rotating the root end interface relative to the base structure.

14. A blade manipulation system, comprising:

a root end element for attachment to a root end of a wind turbine blade having a longitudinal axis and comprising the root end, a root region, an airfoil region with a tip, a pressure side, a suction side and a chord line extending between a leading edge and a trailing edge, the root end having a root end surface, an inner root surface, and an outer root surface, the root end surface being ring formed in a root end plane substantially perpendicular to the longitudinal axis, the root end element comprising:

a plurality of attachment points for attachment to the root end, the plurality of attachment points being positioned along an attachment point circle in a root end element plane; and a plurality of manipulator attachment points configured for cooperation with a root end interface of a root end manipulator, the plurality of manipulator attachment points including a first manipulator attachment point. a second manipulator attachment point and a third manipulator attachment point, the plurality of manipulator attachment points being positioned along a manipulator attachment point circle in the root end element plane, and wherein the manipulator attachment point circle is smaller than the attachment point circle, wherein the root end element is configured to support the root end of the wind turbine blade; and the root end manipulator, wherein the root end manipulator is configured to manipulate the wind turbine blade, the root end manipulator comprising:

a base structure configured to contact the ground and a root end interface connected to the base structure, wherein the root end interface is configured for cooperation with the root end element attached to the root end of the wind turbine blade.

15. The blade manipulation system according to claim 14, further comprising a tip end structure configured to support the airfoil region of the wind turbine blade, the tip end structure comprising a tip end clamp part configured to be secured to the airfoil region and tip end base structure configured to contact the ground, the tip end clamp part being pivotably connected to the tip end base structure.

16. A root end element for attachment to a root end of a wind turbine blade having a longitudinal axis and comprising the root end, a root region, an airfoil region with a tip, a pressure side, a suction side and a chord line extending between a leading edge and a trailing edge; the root end having a root end surface, an inner root surface, and an outer root surface, the root end surface being ring formed in a root end plane substantially perpendicular to the longitudinal axis, the root end element comprising:

a plurality of attachment points for attachment to the root end, the plurality of attachment points being positioned along an attachment point circle in a root end element plane; and an inner rim forming an inner rim circle in the root end element plane, wherein the inner rim comprises an inner rim surface with an inner rim surface normal in the root end element plane, the inner rim surface having a width perpendicular to the root end element plane, wherein the inner rim comprises a first inner rim surface with a first inner rim surface normal spanning a first angle with the root end element plane, wherein the inner rim comprises a second inner rim surface with a second inner rim surface normal spanning a second angle with the root end element plane, and wherein the root end element is configured to support the root end of the wind turbine blade.

* * * * *